E. P. KENDALL.
SCALE ATTACHMENT.
APPLICATION FILED OCT. 18, 1913.
1,114,004.  Patented Oct. 20, 1914.
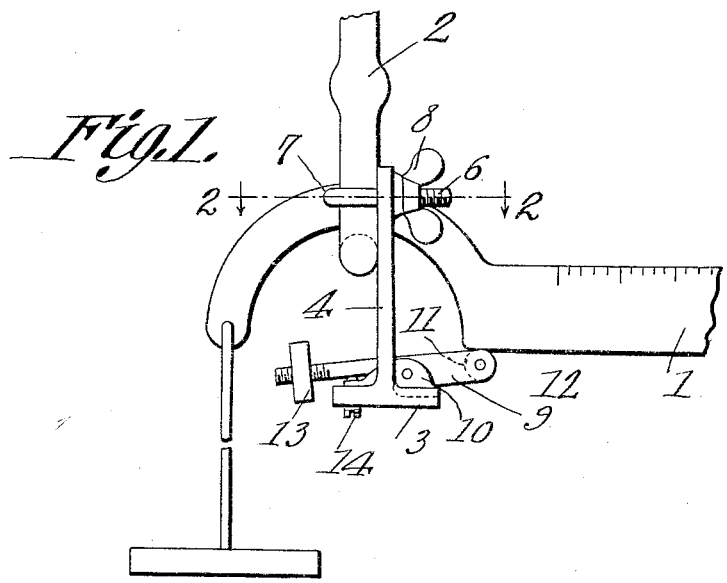
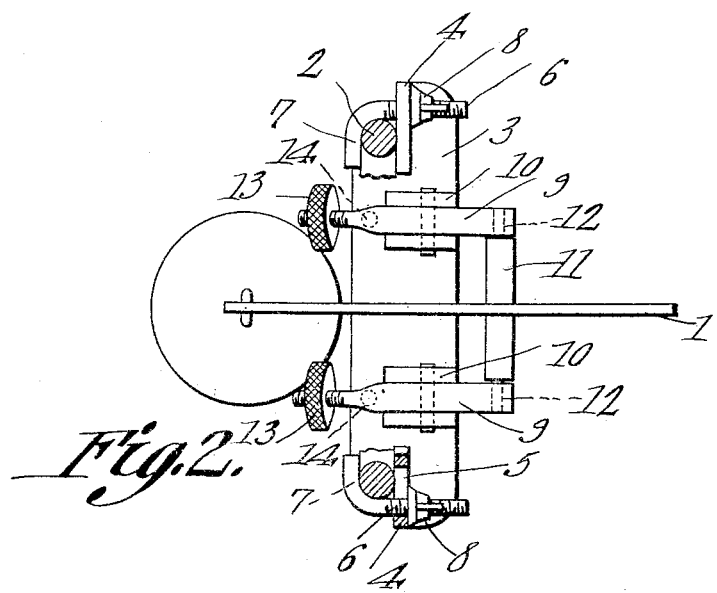
E. P. Kendall,
Inventor

UNITED STATES PATENT OFFICE.

EDWARD P. KENDALL, OF BOWDOINHAM, MAINE.

SCALE ATTACHMENT.

1,114,004.  Specification of Letters Patent.  Patented Oct. 20, 1914.

Application filed October 18, 1913. Serial No. 795,896.

*To all whom it may concern:*

Be it known that I, EDWARD P. KENDALL, a citizen of the United States, residing at Bowdoinham, in the county of Sagadohoc and State of Maine, have invented a new and useful Scale Attachment, of which the following is a specification.

The present invention appertains generally to weighing scales, and aims to provide a novel and improved attachment for platform or bag-filling scales, which shall be operable to raise or lift the scale beam prior to the actual weight, whereby when a bag or other receptacle is being filled with grain or other material, the pre-lifting of the scale beam will indicate that the draft of grain or the like, within the bag, has attained almost the amount desired, which will permit the flow of grain to be checked or arrested to avoid an overweight or overdraft.

Another object of the present invention is to provide a device of the nature indicated, which may be readily and effectively attached to the loop through which the free end of the scale beam passes, and to coöperate with the scale beam to give a slight lifting tendency thereto, the present device being so operable, as to release the scale beam, after the scale beam has been slightly raised by the present device, in order that the usual free movement of the scale beam may be attained.

It is also within the spirit of the present invention to provide a device of the character specified, comprising a simple, compact and inexpensive construction, as well as being simple, convenient and efficient in its use.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a side elevation of the improved attachment as applied to the scale beam loop, only fragmental portions of the scale beam and scale beam loop being shown. Fig. 2 is a sectional view taken on the line 2—2 of Fig. 1, portions being broken away.

In the drawing, the free end of a scale beam has been designated by the numeral 1, and the loop through which the free end of the scale beam 1 passes, has been designated by the numeral 2, the said loop being suspended or hung from the usual frame of the platform or bag-filling scales. The said parts are common in scales, and need no further detailed description.

The present attachment is designed for application to the scale beam loops of various platform scales or the like, in order to give a slight lifting tendency to the scale beam. In carrying out the present invention, there is provided a cross piece or yoke 3 having the upstanding arms 4 at its ends, the said parts constituting a U-shaped body for the attachment. The arms 4 of the body are provided at their upper ends or terminals with transverse slots 5, through which bolts 6 are passed, certain ends of the bolts 6 being hooked or bent angularly, as at 7, and thumb or wing nuts 8 being threaded on the other ends of the bolts 6 to seat against the arms 4.

Upon the cross piece or yoke 3 are fulcrumed two levers 9, the cross piece 3 being preferably provided with two pairs of upstanding ears 10 between which the respective levers are fulcrumed. Between certain ends of the levers 9 is disposed a roller or bearing 11, having the terminal trunnions 12 journaled through the corresponding ends of the levers 9. Threaded upon the other ends of the levers 9 are suitable weights 13, these weights being adjustable by reason of their threaded engagement with the levers. The weights 13 are designed to overbalance the roller 11, in order to give a lifting tendency to the roller.

The upward movement of the roller, when the levers are swung, is limited by means of a pair of stop screws 14 threaded through the cross piece 3 under the weighted arms of the levers 9, the stop screws 14 being adjustable in order that the roller 11 may be properly limited in movement.

In practice, the upper end portions of the arms 4 are adapted to rest against the sides of the scale beam loop 2, the hooks of the bolts 6 being engaged over the opposite sides of the side members of the loop 2 and the nuts 8 being tightened to clamp the arms 4 against the side members of the scale beam loop. In this manner, the body of the attachment may be applied in a simple and efficient manner to the scale beam loop, to support the cross piece or yoke 3 below the scale beam loop. The body of the attachment is properly adjusted upon the scale beam loop in order that the roller 11 may engage the lower edge of the scale beam 1. The weights 13 are then properly adjusted, to give a sufficient lifting tendency to the scale beam, and the stops 14 are set, to limit the upward movement of the roller 11, so as to relieve the scale beam 1 of the tension of the weights 13, after the scale beam has been lifted slightly.

The present attachment is especially useful in connection with filling bags or other receptacles with grain, or other material, although the present device may be employed in other capacities. When the present device is employed in connection with a scale for bagging grain or the like, the scale beam will normally rest upon the roller 11, the counterpoise weight upon the scale beam overbalancing the weights 13, and normally holding the scale beam against the bottom or lower end of the loop 2. When the grain which is run or injected into the bag or other receptacle, reaches a weight slightly less than the full weight of grain desired, the scale beam will be lifted or raised slightly through the action of the lifting device carried by the present attachment, the weights 13 swinging the roller 11 upwardly to carry out the said result. As a consequence, the scale beam in being pre-lifted, will warn the operator that the weight of the material is almost equal to the amount desired, which will permit the operator to check or arrest the flow of grain or the like, so as to prevent an overdraft or overweight, which not infrequently otherwise results. Without the present attachment, when the weight of the material reaches the desired point, the scale beam will be quickly thrown upwardly, not giving sufficient time for stopping the flow of grain, and thereby causing an overdraft, which is very undesirable.

After the scale beam has been pre-lifted by the present attachment, the weighing operation may be continued as usual, the present attachment not interfering with the movement of the scale beam, after the scale beam has been slightly lifted or raised.

In view of the foregoing, taken in connection with the drawing, the other advantages and capabilities of the present device will be apparent to those versed in the art, and need not be itemized at length, it being noted that the objects aimed at have been carried out satisfactorily.

Having thus described the invention, what is claimed as new is:—

1. In a device of the character described, a U-shaped body, means carried by the arms of the body for engaging the side members of a scale beam loop, and lifting means carried by the intermediate portion of the body coöperable with the scale beam.

2. In a device of the character described, a U-shaped body, means carried by the arms of the body for engaging the side members of a scale beam loop, lifting means carried by the intermediate portion of the body coöperable with the scale beam, and means carried by the intermediate portion of the body for limiting the movement of the lifting means.

3. In a device of the character described, a U-shaped body, the arms having transverse slots, bolts passing through the said slots and having hooks to engage over the side members of a scale beam loop, thumb nuts carried by the bolts to engage the arms of the said body, and lifting means carried by the intermediate portion of the body coöperable with the scale beam.

4. In a device of the character described, a member attachable to the frame of a scale beam, a lever fulcrumed upon the said member and having scale beam engaging means at one end, a weight carried by the other end of the lever, and an adjustable stop carried by the said member to limit the movement of the lever.

5. In a device of the character described, a member attachable to a frame of a scale beam, a pair of levers fulcrumed upon the said member, a roller terminally journaled between certain arms of the said levers and adapted to engage the lower edge of a scale beam, and weights carried by the other arm of the levers.

6. In a device of the character described, a U-shaped body, the arms of which are attachable to the side members of a scale beam loop, a lever fulcrumed upon the intermediate portion of the body, and having scale beam engaging means at one end, and a weight carried by the other end of the lever.

7. In a device of the character described, a U-shaped body, the arms of which are attachable to the side members of a scale beam loop, a pair of levers fulcrumed upon the intermediate portion of the body, a scale beam engaging roller journaled between certain ends of the levers, weights adjustable upon the other ends of the levers, adjustable stops carried by the intermediate portion of the body to limit the movement of the weighted arms of the lever.

8. An attachment for scales, comprising a member having means for engaging a scale beam loop, and lifting means carried by the said member and coöperable with the scale beam.

9. A scale attachment embodying a member having means for engaging a scale beam loop, movable lifting means carried by said member and coöperable with the scale beam, and an adjustable stop carried by the member for limiting the movement of the lifting means.

10. A scale attachment embodying a member having means for engaging a scale beam loop, a lever fulcrumed upon the said member and having scale beam engaging means at one end, and a weight carried by the other end of the lever.

In testimony that I claim the foregoing as my own, I have hereto affixed my signature in the presence of two witnesses.

EDWARD P. KENDALL.

Witnesses:
ALTON C. SMALL,
ROBERT E. FERGUSON.

Copies of this patent may be obtained for five cents each, by addressing the "Commissioner of Patents, Washington. D. C."